United States Patent
Rioux et al.

(10) Patent No.: US 10,018,118 B2
(45) Date of Patent: Jul. 10, 2018

(54) SPLITTER FOR AIR BLEED MANIFOLD

(71) Applicant: UNITED TECHNOLOGIES CORPORATION, Farmington, CT (US)

(72) Inventors: Philip Robert Rioux, North Berwick, ME (US); Rishon Saftler, Glastonbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 293 days.

(21) Appl. No.: 14/762,092

(22) PCT Filed: Dec. 18, 2013

(86) PCT No.: PCT/US2013/076111
§ 371 (c)(1),
(2) Date: Jul. 20, 2015

(87) PCT Pub. No.: WO2014/143296
PCT Pub. Date: Sep. 18, 2014

(65) Prior Publication Data
US 2015/0354457 A1 Dec. 10, 2015

Related U.S. Application Data

(60) Provisional application No. 61/783,596, filed on Mar. 14, 2013.

(51) Int. Cl.
*F02C 7/18* (2006.01)
*F01D 25/24* (2006.01)
*F02C 6/08* (2006.01)

(52) U.S. Cl.
CPC .............. *F02C 7/18* (2013.01); *F01D 25/243* (2013.01); *F01D 25/246* (2013.01); *F02C 6/08* (2013.01);
(Continued)

(58) Field of Classification Search
CPC ..................................... F02C 7/18; F02C 6/08
See application file for complete search history.

(56) References Cited

U.S. PATENT DOCUMENTS 3,966,354 A   6/1976 Patterson
4,155,681 A * 5/1979 Linko, III ................. F02C 6/08
                                                         415/115
(Continued)

FOREIGN PATENT DOCUMENTS

FR          2295239 A1    7/1976

OTHER PUBLICATIONS

International Search Report for related PCT Application No. PCT/US2013/076111; report dated Apr. 18, 2014.
European Search Report for Application No. EP 13 87 8468.

*Primary Examiner* — Patrick Maines
(74) *Attorney, Agent, or Firm* — Cantor Colburn LLP

(57) ABSTRACT

A splitter for protecting parts of a gas turbine engine is provided. The splitter segregates the flow of hot and cold gases into the air bleed manifold around the high compressor section to reduce maximum temperatures and minimize the temperature gradients of engine parts, especially inner case flanges The splitter divides the air bleed manifold into an annular inner cavity and an outer cavity. The splitter directs relatively cold air from the high compressor bleed ducts into the inner cavity and relatively hot air from the aft hub into the outer cavity, away from the inner case flanges.

8 Claims, 1 Drawing Sheet

(52) U.S. Cl.
  CPC ..... *F05D 2240/12* (2013.01); *Y10T 29/49828* (2015.01)

(56) References Cited

U.S. PATENT DOCUMENTS

| | | | | |
|---|---|---|---|---|
| 4,329,114 | A | * | 5/1982 | Johnston ................. F01D 11/24 415/116 |
| 4,463,552 | A | | 8/1984 | Monhardt et al. |
| 4,553,901 | A | | 11/1985 | Laurello |
| 5,160,241 | A | * | 11/1992 | Glynn ...................... F01D 9/06 415/116 |
| 5,203,162 | A | * | 4/1993 | Burge ...................... F02C 6/08 60/39.091 |
| 5,351,478 | A | * | 10/1994 | Walker .................... F01D 25/26 415/144 |
| 2006/0193721 | A1 | | 8/2006 | Adam et al. |
| 2010/0275613 | A1 | * | 11/2010 | Alasti .................... F01D 11/24 60/785 |
| 2011/0058941 | A1 | * | 3/2011 | Behaghel ................ F01D 5/082 415/229 |
| 2011/0247344 | A1 | | 10/2011 | Glahn et al. |
| 2014/0140828 | A1 | * | 5/2014 | Rioux .................... F04D 19/02 415/175 |
| 2016/0069210 | A1 | * | 3/2016 | Rioux ...................... F02C 7/24 415/177 |

\* cited by examiner

SPLITTER FOR AIR BLEED MANIFOLD

CROSS-REFERENCE TO RELATED APPLICATIONS

This patent application is a 35 USC § 371 U.S. national stage filing of International Patent Application No. PCT/US13/76111 filed on Dec. 18, 2013, which claims priority under the 35 USC § 119(e) to U.S. Provisional Patent Application Ser. No. 61/783,596, filed on Mar. 14, 2013.

FIELD OF THE DISCLOSURE

The subject matter of the present disclosure relates generally to gas turbine engines. More particularly, the subject matter of the present disclosure relates to a splitter that segregates the flow of hot and cold gases in an air bleed manifold to reduce maximum temperatures and minimize the temperature gradients of engine parts, especially engine flanges, thereby prolonging engine part life.

BACKGROUND OF THE DISCLOSURE

Gas turbine engines, such as those used on jet aircraft, generally comprise an air intake port, a fan mounted on a hub near the air intake port and surrounded by a fan case which is mounted within an engine housing or nacelle, a low pressure compressor (LPC) section, an intermediate section aft of the LPC section, a high pressure compressor (HPC) section, a combustion chamber or combustor, high and low pressure turbines that provide rotational power to the compressor blades and fan respectively, and an exhaust outlet. The HPC section includes a number of stages of circumferentially arrayed, stationary stators and rotating blades. Each stator extends radially outward between a rotary disk stack and the inboard surface of an inner case. The inner case may be circumferentially segmented into multiple inner case segments joined by inner case flanges. These inner case flanges are subjected to significant stress during operation.

An outer case and the inner case define the outer and inner circumferentially arranged walls of an air bleed manifold surrounding at least a portion of the HPC. The air bleed manifold defines a cavity and is supplied with air from two sources: cold air from the HPC sixth stage bleed ducts and hot air from the diffuser strut flow from the aft hub.

The cold and hot air mix in the air bleed manifold cavity. The hot air creates maximum temperature and lifting problems due to high temperature gradients and hot air mixing, which raises the steady state temperature of the inner case flanges, even when a heat shield is used. As a result, the hot air can reduce engine part life, including the life of the inner case flanges. The present disclosure is directed at solving this problem.

SUMMARY OF THE DISCLOSURE

According to one embodiment of the disclosure, a splitter for a gas turbine engine is provided. The gas turbine engine comprises a high pressure compressor section including a plurality of stages of circumferentially arrayed stators and rotating blades. Each stator extends radially outward (away from the engine axis) between a rotary disk stack and an inboard surface of an inner case. The inner case is circumferentially segmented into multiple inner case segments joined by inner case flanges. An outer case is substantially concentric with the inner case. The outer case and the inner case form an air bleed manifold. The air bleed manifold defines a cavity supplied with cold air from high compressor bleed ducts and hot air from an aft hub. The splitter is configured to split the air bleed manifold horizontally, directing the cold air into an annular inner cavity between the splitter and the inner case and across the inner case flanges, and the hot air into an outer cavity between the splitter and the outer case.

The splitter defines openings disposed around its aft end through which the cold air can flow. The openings may be circumferentially arranged slits.

The splitter may comprise a body and a circular deflector disposed aft of the body and configured to prevent inflow of hot air into the inner cavity. The deflector may be further configured to direct the cold air into a radially outward flow path.

In another aspect of the disclosure a jet engine is provided. The jet engine comprises a high pressure compressor section, an inner case and an outer case. The high pressure compressor section includes a plurality of stages of circumferentially arrayed stators and rotating blades. Each stator extends radially outward between a rotary disk stack and an inboard surface of the inner case. The inner case is circumferentially segmented into multiple inner case segments joined by inner case flanges. The outer case is substantially concentric with the inner case. The outer case and the inner case form an air bleed manifold. The air bleed manifold defines a cavity supplied with cold air from high compressor bleed ducts and hot air from an aft hub. The jet engine further comprises a splitter configured to direct the cold air into an inner cavity between the splitter and the inner case and across the inner case flanges, and the hot air into an outer cavity between the splitter and the outer case.

In still another aspect of the invention a method of minimizing the temperature gradients of jet engine parts is provided. The jet engine comprises an inner case circumferentially segmented into multiple inner case segments joined by inner case flanges and an outer case substantially concentric with the inner case. The outer case and inner case definine an air bleed manifold in which hot and cold air are mixed. The method comprises the step of: installing a splitter configured to direct the cold air into an inner cavity between the splitter and the inner case and across the inner case flanges and to direct the hot air into an outer cavity between the splitter and the outer case. The cold air may exit the inner cavity through openings disposed in an aft end of the splitter. The method may include the further step of using a circular deflector to deflect the hot air away from the openings. The deflector may also be used to direct the cold air into a radially outward flow path and into the outer cavity.

Although the different examples described herein may have the specific components shown in the illustrations, embodiments of this disclosure are not limited to those particular combinations of components. It is possible to use some of the components or features from one of the examples in combination with features or components from another one of the examples.

BRIEF DESCRIPTION OF THE DRAWINGS

So that the manner in which the concepts of the present disclosure recited herein may be understood in detail, a more detailed description is provided with reference to the embodiments illustrated in the accompanying drawings. It is to be noted, however, that the accompanying drawings illustrate only certain embodiments and are therefore not to be considered limiting of the scope of the disclosure, for the concepts of the present disclosure may admit to other equally effective embodiments. Moreover, the drawings are not necessarily to scale, emphasis generally being placed upon illustrating the principles of certain embodiments.

Thus, for further understanding of these concepts and embodiments, reference may be made to the following detailed description, read in connection with the drawings in which.

DETAILED DESCRIPTION

In the disclosure that follows certain relative positional terms are used such as "forward", "aft", "upper", "lower", "above", "below", "inner", "outer" and the like. These terms are used with reference to the normal operational attitude of a jet engine and should not be considered otherwise limiting. The forward end of a jet engine generally refers to the air inlet end and the aft end generally refers to the exhaust end. Also, "radially outward" generally refers to a direction away from the engine center line while "radially inward" refers to a direction toward the engine center line.

A typical turbofan jet engine works by forcing compressed air into a combustion chamber where it is mixed with fuel and ignited so that the exhaust gases exit a downstream nozzle, thereby creating thrust.

Figure 1:
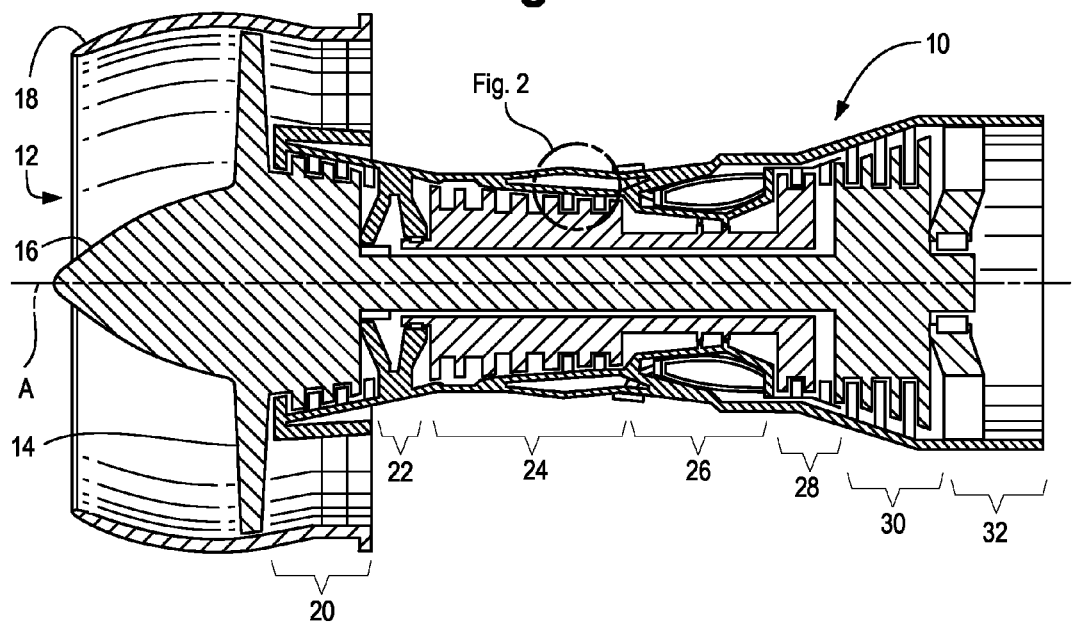
FIG. 1 is a longitudinal sectional view of an exemplary gas turbine engine that may be equipped with a splitter according to the present disclosure.

FIG. 1 is a longitudinal sectional view of an exemplary turbofan jet engine 10 that may be equipped with a split manifold according to the present disclosure. The engine 10 comprises an air intake port 12, a fan 14 mounted on a hub 16 near the air intake port 12 and surrounded by a fan case 18 which is mounted within an engine housing or nacelle (not shown), a low pressure compressor (LPC) section 20, an intermediate section 22 aft of the LPC section 20, a high pressure compressor (HPC) section 24, a combustion chamber or combustor 26, high and low pressure turbines 28, 30 that provide rotational power to the compressor blades and fan 14 respectively, and an exhaust outlet 32.

Figure 2:
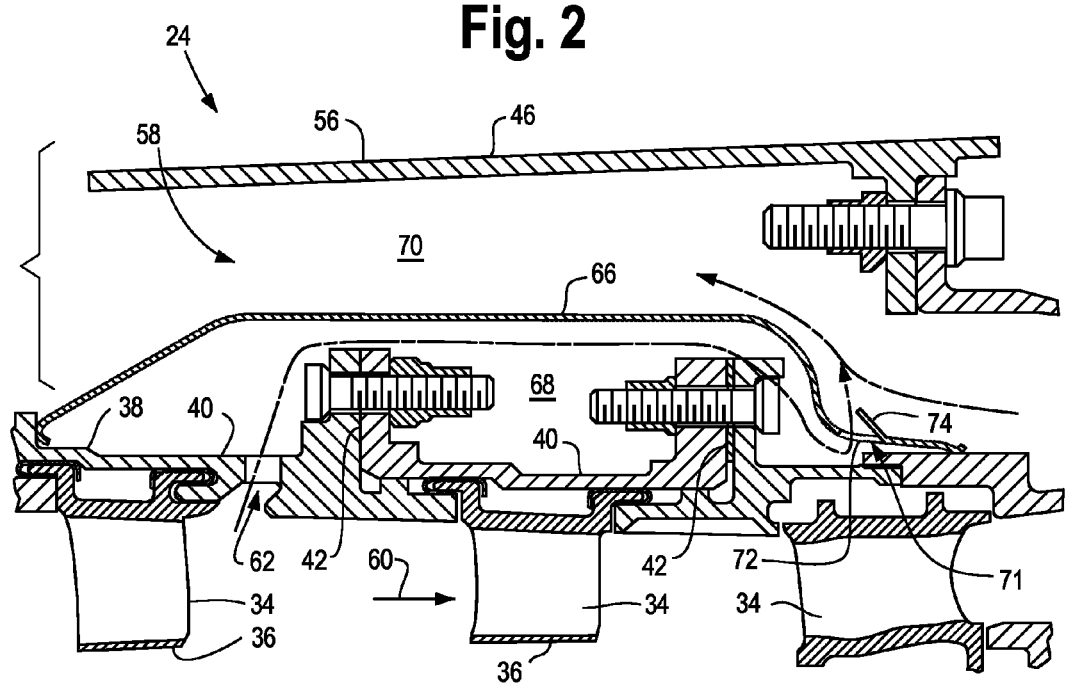
FIG. 2 is a longitudinal sectional view of a portion of a high pressure compressor section such as that shown in FIG. 1.

FIG. 2 is a longitudinal sectional view of a portion of a high pressure compressor (HPC) section 24 such as might be found in the engine of FIG. 1. The HPC section 24 includes a number of stages of circumferentially arrayed stationary vanes or stators 34 and rotating blades (not shown in FIG. 2). Each stator 34 extends radially outward between a rotary disk stack 36 and the inboard surface of a shroud or inner case 38. The inner case 38 may be circumferentially segmented into multiple inner case segments 40 joined by inner case flanges 42. These inner case flanges 42 are subjected to significant stress during operation. An outer case 46 and the inner case 38 define the outer and inner circumferential walls of an air bleed manifold 56. The outer case 46 may be substantially concentric with the inner case 38 and is located radially outward from the inner case 38, away from the engine axis A. The air bleed manifold 56 defines a cavity 58 and is supplied with air from two sources: cold air from the sixth stage bleed ducts 62 and hot air from the diffuser strut flow from the aft hub.

The flow 60 of relatively cold compressed air through the HPC passes through the stators 34 in a predominantly horizontal direction, that is, predominantly parallel to engine axis A. A low percentage, perhaps 2% or less, of relatively cold compressed air from the sixth stage of the HPC 24 may be bled off through bleed slots or ducts 62 and into the air bleed manifold cavity 58 to help cool the turbines. At the same time, relatively hot air may flow forward into the air bleed manifold cavity 58. The hot air may be recovered leakage air from some ID leak paths and flows into the air bleed manifold 56 to be reused. The cold and hot air mix in the air bleed manifold cavity 58 and then exit the manifold 56.

The hot air creates maximum temperature and lifting problems due to high temperature gradients and hot air mixing, which raises the steady state temperature of the inner case flanges 42 even when a heat shield is used. As a result, the hot air can reduce engine part life, including the life of the inner case flanges 42.

To address this problem, a splitter 66 is provided that splits the air bleed manifold cavity 58 horizontally—in the longitudinal direction—into an annular inner cavity 68 and an outer cavity 70. The sixth stage bleed air flows underneath the splitter 66 into the inner cavity 68, flowing over the inner cases flanges 42 to help maintain the inner case flanges 42 at a lower temperature. The cold air exits the inner cavity 68 through openings such as circumferential slits 71 located at or near the aft end 72 of the manifold 56.

Meanwhile, the hot air enters the outer cavity 70 of the air bleed manifold 56 and mixes with the cold air exiting the inner cavity 68. As a result, instead of the hot and cold air mixing as they pass over the inner case flanges 42, they mix after only the cold air has passed over the inner case flanges 42. The cold air then mixes with the hot air in the outer cavity 70, that is, on the side of the splitter 66 away from the inner case flanges 42.

The splitter 66 is a substantially cylindrical structure and may be bolted or otherwise affixed to the inner case 38 or other engine structure. The air bleed manifold 56 may comprise at its aft end openings such circumferentially arranged slits through which the cold air can flow. After exiting the slits 71, the cold air impinges on a circular deflector 74 which directs the cold air into a radially outward flow path like that of the hot air. The deflector 74 also helps prevent any inflow of hot air into the inner cavity 68 under the splitter 66. The deflector 74 may be affixed to the splitter 66. The deflector 74 may be an undivided unitary part of the splitter 66. The deflector 74 may form a continuous ring-like structure, or may be formed of segments corresponding to and disposed downstream of the slits 71.

In another aspect of the invention a method of minimizing the temperature gradients of jet engine parts is provided. The jet engine comprises an inner case circumferentially segmented into multiple inner case segments joined by inner case flanges and an outer case substantially concentric with the inner case. The outer case and inner case definine an air bleed manifold in which hot and cold air are mixed. The method comprises the step of: installing a splitter configured to direct the cold air into an inner cavity between the splitter and the inner case and across the inner case flanges and to direct the hot air into an outer cavity between the splitter and the outer case. The cold air may exit the inner cavity through openings disposed in an aft end of the splitter. The method may include the further step of using a circular deflector to deflect the hot air away from the openings. The deflector may also be used to direct the cold air into a radially outward flow path and into the outer cavity.

INDUSTRIAL APPLICATIONS

The splitter 66 of the present disclosure reduces the maximum temperature and gradients of the inner case flanges 42 while maintaining the same air flow and temperature of the supply air leaving the manifold 56. The splitter 66 also protects the inner case flanges 42 from variations in the aft hub hot air flow due to upstream and downstream changes, such as turbine cooling flow reductions that can force an increase in the aft hub hot air flow. The splitter 66 can help prevent increased manifold temperatures due to increased hot air flow and decreased cold air flow. The splitter 66 eliminates such problems allowing for a more robust system.

The disclosed apparatus is intended for use in jet engines and, more specifically, commercial turbofan jet engines. The disclosed apparatus may be applicable in any situation where it is desired to extend inner case flange life.

While the present disclosure has been shown and described in terms of one or more exemplary embodiments, it will be understood by one skilled in the art that various changes in detail may be effected therein without departing from the spirit and scope of the disclosure as defined by claims that may be supported by the written description and drawings. Further, where these exemplary embodiments (and other related derivations) are described with reference to a certain number of elements it will be understood that other exemplary embodiments may be practiced utilizing either less than or more than the certain number of elements.

What is claimed is:

1. A jet engine comprising:
a high pressure compressor section including a plurality of stages of circumferentially arrayed stators and rotating blades, each stator extending radially outward between a rotary disk stack and an inboard surface of an inner case, the inner case being circumferentially segmented into multiple inner case segments joined by inner case flanges;
an outer case substantially concentric with the inner case, the outer case and inner case defining an air bleed manifold, the air bleed manifold defining a cavity supplied with cold air from high compressor bleed ducts and hot air from an aft hub; and
a splitter secured to the inner case, wherein the splitter encloses the inner case flanges in an annular inner cavity located between the splitter and the inner case, the splitter having a forward end and an aft end, the aft end being closer to a combustor of the engine than the forward end, a plurality of openings located near the aft end of the splitter and a deflector located adjacent and aft of the plurality of openings, wherein the deflector is configured to direct air that has travelled from the annular inner cavity and through the plurality of openings in a radially outward flow path into an outer cavity located between the splitter and the outer case.

2. The jet engine of claim 1 wherein: the plurality of openings are circumferentially arranged slits.

3. The jet engine of claim 1 wherein the splitter has a body and the deflector is a circular deflector disposed aft of the splitter body and configured to prevent inflow of hot air into the inner cavity.

4. The jet engine of claim 1 wherein the deflector is affixed to the splitter.

5. The jet engine of claim 1 wherein the deflector is an undivided unitary part of the splitter.

6. A method of minimizing the temperature gradients of jet engine parts, the jet engine comprising an inner case circumferentially segmented into multiple inner case segments joined by inner case flanges, an outer case substantially concentric with the inner case, the outer case and inner case defining an air bleed manifold in which hot and cold air are mixed, the method comprising the step of:
using a splitter to cause air from a compressor of the engine to pass over the inner case flanges located in an inner cavity located between the splitter and the inner case prior to it mixing with hotter air entering into an outer cavity located between the splitter and the outer case;
releasing the air in the inner cavity through openings disposed in an aft end of the splitter, wherein the openings are aft of the inner case flanges; and
deflecting air in the outer cavity away from the openings with a deflector located aft of the openings.

7. The method of claim 6, wherein the deflector is a circular deflector.

8. The method of claim 6 comprising the further step of:
deflecting air exiting from the inner cavity via the openings in a radially outward direction.

\* \* \* \* \*